United States Patent [19]

Faulkner et al.

[11] Patent Number: 6,090,353
[45] Date of Patent: Jul. 18, 2000

[54] METHOD OF REMOVING IMPURITIES FROM MINERAL CONCENTRATES

[75] Inventors: Bobby P. Faulkner, New Berlin; John M. Paustian, Milwaukee, both of Wis.

[73] Assignee: Svedala Industries, Inc., Waukesha, Wis.

[21] Appl. No.: 09/053,184

[22] Filed: Apr. 1, 1998

[51] Int. Cl.[7] .......................... C01B 25/10; C01B 25/26; C01B 33/20; C01B 33/26; C01B 33/12

[52] U.S. Cl. .......................... 423/1; 423/301; 423/305; 423/307; 423/308; 423/311; 423/326; 423/327.1; 423/328.1; 423/328.2; 423/335; 423/340; 423/490; 423/605; 423/87; 423/89; 423/98; 423/49; 423/150.1; 423/155; 423/157.2; 423/179; 423/202; 423/47; 423/300

[58] Field of Search .......................... 423/46, 47, 335, 423/340, 490, 327.1, 328.1, 328.2, 300, 301, 305, 307, 308, 311, 326, 605, 87, 89, 98, 138, 49, 155, 157.2, 150.1, 179, 202, 1

[56] References Cited

U.S. PATENT DOCUMENTS

| | | |
|---|---|---|
| 412,300 | 10/1889 | Selwyn . |
| 604,167 | 5/1898 | Currie et al. . |
| 723,787 | 3/1903 | Trivick . |
| 824,663 | 6/1906 | Koehler . |
| 841,328 | 1/1907 | Lander . |
| 913,535 | 2/1909 | Moore . |
| 1,103,258 | 7/1914 | Brackelsberg . |
| 1,124,519 | 1/1915 | Ramen et al. . |
| 2,592,973 | 4/1952 | Sturgeon et al. .................. 423/340 |
| 2,681,855 | 6/1954 | Holmberg ........................... 75/113 |
| 2,686,114 | 8/1954 | McGauley et al. .................. 423/87 |
| 2,756,136 | 7/1956 | Queneau ............................... 75/5 |
| 2,805,120 | 9/1957 | Plant .................................... 23/87 |
| 2,839,361 | 6/1958 | Hollingworth et al. .......... 423/157.2 |
| 3,050,364 | 8/1962 | Segrove ............................. 423/340 |
| 3,078,156 | 2/1963 | Yamaguchi ....................... 423/307 |
| 3,116,973 | 1/1964 | Haden, Jr. .......................... 423/335 |
| 3,318,685 | 5/1967 | Handwerk ............................. 75/3 |
| 3,482,964 | 12/1969 | Ishimitsu .............................. 75/5 |
| 3,649,245 | 3/1972 | Colombo et al. ................. 423/138 |
| 3,674,424 | 7/1972 | Stanley et al. ..................... 423/87 |
| 3,865,240 | 2/1975 | Schick ................................. 209/5 |
| 4,180,546 | 12/1979 | Shibata et al. ..................... 423/490 |
| 4,259,106 | 3/1981 | Aaltonen et al. ..................... 75/7 |
| 4,410,496 | 10/1983 | Smyres et al. ....................... 423/1 |
| 4,612,171 | 9/1986 | Holmström ......................... 423/22 |
| 4,642,133 | 2/1987 | Mäkinen et al. ...................... 75/2 |
| 4,983,370 | 1/1991 | Loritsch et al. ................... 423/340 |
| 5,612,008 | 3/1997 | Kirk et al. ........................... 423/60 |

FOREIGN PATENT DOCUMENTS

| | | | |
|---|---|---|---|
| 876619 | 7/1971 | Canada | ............ 423/157.2 |
| 160967 | 7/1984 | German Dem. Rep. . | |
| 479728 | 1/1973 | U.S.S.R. | ............ 423/340 |

*Primary Examiner*—Steven Bos
*Attorney, Agent, or Firm*—Andrus, Sceales, Starke & Sawall

[57] ABSTRACT

A process for removing impurities contained in the crystal lattice of minerals, comprising the steps of forming a mixture of a mineral capable of structurally reorganizing its crystal lattice which contains an impurity in its crystal lattice and a halogen anion, and water; heating the mixture to the mineral's structural reorganization transition temperature; holding the mixture at the structural reorganization transition temperature for a sufficient period of time to allow the impurity to freely migrate from the lattice to combine with the halogen anion; and separating the combined impurity and anion from the mixture to render the mineral essentially free of the impurity. The process is applicable to numerous minerals and impurities, but is especially useful to remove arsenic from fluorspar. Numerous halogen anions can be employed, such as chlorides, fluorides, bromides and iodides, but the preferred halogen anion is a metal chloride such as calcium chloride. Various matrix-forming additives may also be employed with the mixture to provide a receptor which immobilizes the impurity. Preferred additives are silicates, added in the form of bentonite or other clays.

18 Claims, 4 Drawing Sheets

METHOD OF REMOVING IMPURITIES FROM MINERAL CONCENTRATES

CROSS-REFERENCE TO RELATED APPLICATIONS

N/A

STATEMENT REGARDING FEDERALLY SPONSERED RESEARCH OR DEVELOPMENT

N/A

BACKGROUND OF THE INVENTION

The present invention relates to a process for removing impurities from minerals, and more particularly to a process for removing impurities contained in the crystal lattice of minerals.

It is well known that impurities, whether they be desirable or undesirable, may be separated from a mineral or ore by forming suitable salts, i.e. chlorides, bromides, or other haloid salts, which are then separated by vaporizing these salts at relatively moderate temperatures. One of the most widely accepted techniques is the chlorination of an ore or mineral concentrate. Various chlorination methods have been developed for this purpose. In the practice of such chlorination processes, briquettes or pellets of the ore or mineral concentrate are prepared. These briquettes or pellets are then placed in a furnace and are subjected to contact with gaseous chlorine at an elevated temperature, normally above 500° C. and usually from about 800° C. to about 1200° C. to affect chlorination. The chlorides, now containing the impurity, are vaporized and later condensed in suitable condensation equipment. Typical processes for affecting such chlorination are described in U.S. Pat. Nos. 2,681,855, 3,482,964, 4,612,171 and 4,642,133.

Normal separation techniques, such as chlorination, flotation, or other well known techniques for beneficiating minerals cannot remove impurities contained in the crystal lattice of minerals. Impurities such as arsenic may have found their way in the mineral lattice as the mineral was formed. It is desirable to remove such undesirable impurities to thereby enhance the value of the mineral.

SUMMARY OF THE INVENTION

The present invention provides a process for the removal of undesirable impurities contained in the crystal lattice of minerals. More particularly, the invention relates to the pyro treatment of a mineral to structurally reorganize the mineral and thereby allow an impurity to freely migrate from the crystal lattice during the structural reorganization to combine with a halogen anion. The anion together with the impurity is thereafter readily separable from the mineral, e.g. by leaching, to thus render the mineral essentially free of the impurity.

Numerous minerals will undergo a structural reorganization, i.e. a reorientation of its crystal lattice, under certain temperature and time conditions. It has been discovered that during this change in the mineral's structure an impurity in the crystal lattice, which may be very difficult to remove by common mineral purification techniques, becomes free and available which allows the impurity to be mobile and thus removable. The impurity can freely migrate to other sites within the mineral or externally to combine with an anion intimately mixed with the mineral. It has further been discovered that in some cases a matrix-forming additive facilitates the migration of the impurity to the anion.

In accordance with the invention, there is disclosed a process for removing impurities contained in the crystal lattice of minerals, comprising the steps of forming a mixture of a mineral containing an undesirable impurity in its crystal lattice, the mineral capable of structurally changing to reorientate its crystal lattice, a halogen anion, and water; heating the mixture to the mineral's structural reorganization transition temperature; holding the mixture at the transition temperature for a sufficient period of time to allow the impurity to freely migrate from the lattice and combine with the halogen anion; and separating the combined impurity and anion from the mixture to render the mineral essentially free of the impurity. The process is applicable to numerous minerals including most silicates and metal oxides such as fluorspar, spodumene, pyrolusite, braunite, quartz, apatite, bobierrite, evansite, zirconium silicate, feldspars, leurite and anauxite. Also, numerous halogen anions can be employed, such as chlorides, fluorides, bromides and iodides. The preferred halogen anion is a metal chloride such as calcium chloride because it has a relatively high melt temperature and has a high affinity for arsenic. Also, numerous impurities can be removed via the present process such as arsenic and various metal ions such as metal oxides. Various matrix-forming additives may also be employed with the mixture to facilitate the migration of the impurity from the crystal lattice to the anion. Preferred additives are silicates, added in the form of bentonite, and other clays such as montmorillonite and others of the kaolinite group.

As noted above, during the mineral's structural reorganization the impurity combines with the anion to form a halogen salt and this salt is separated to render the mineral essentially free of the impurity. The separating step preferably comprises solubilizing the salt by leaching with an acid such as hydrochloric acid. However, other acids such as nitric acid may also be employed, as well as bases such as sodium hydroxide depending upon the mineral and the impurity to be separated.

DESCRIPTION OF THE PREFERRED EMBODIMENT

Figure 1:
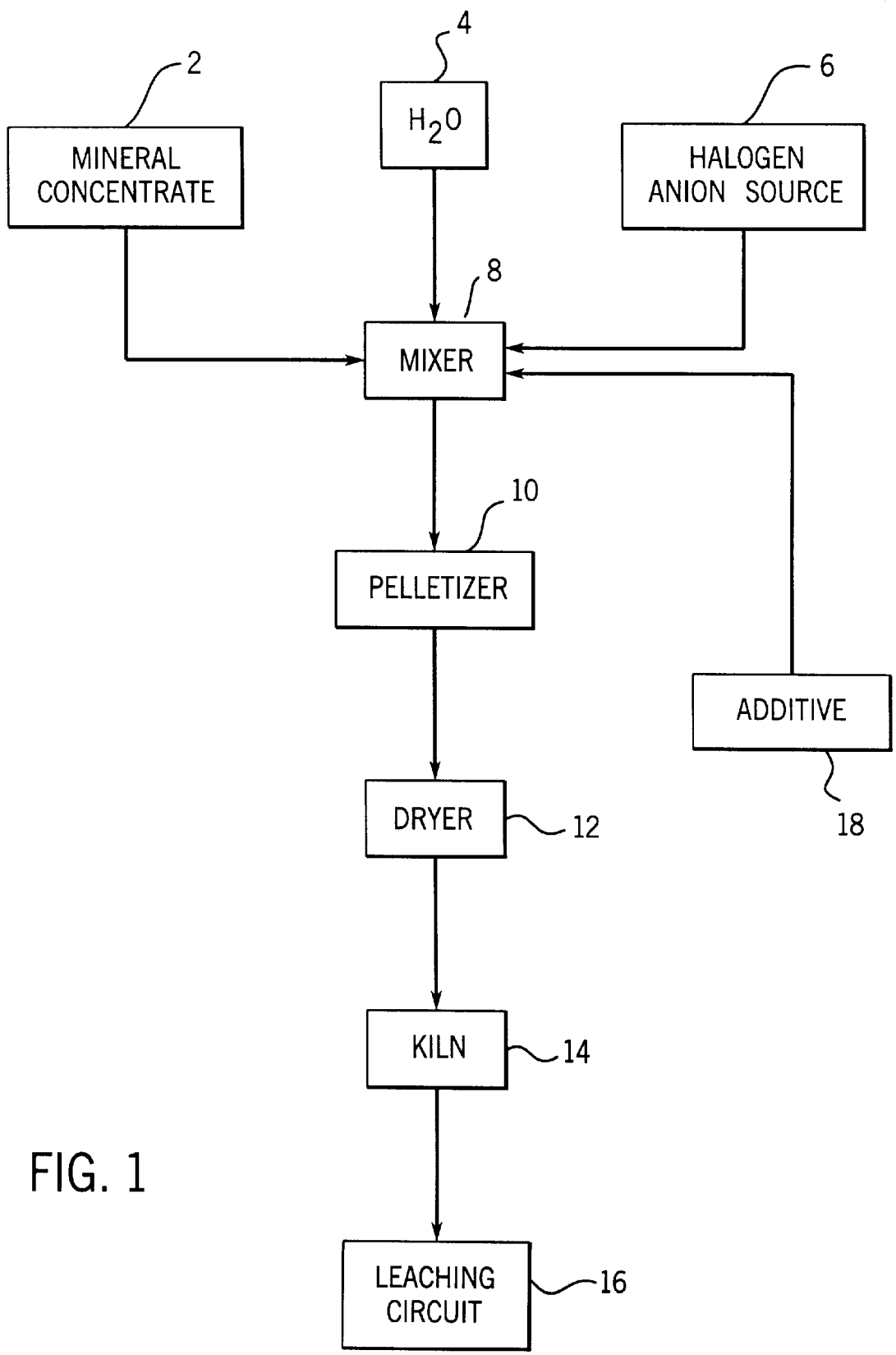
FIG. 1 illustrates a flow diagram of the process of the present invention.

Referring now to the drawings, FIG. 1 illustrates a flow chart describing a preferred process to remove undesirable impurities found in the crystal lattice of minerals to thereby enhance the value of the mineral. As a first step in the process, mineral concentrate represented by 2, water represented by 4 and a halogen anion source represented by 6 are fed to a mixer 8 to form a homogeneous admixture of the three ingredients. Mixer 8 can be of any conventional type commonly employed in the industry to thoroughly and intimately mix these ingredients. Preferably, mixer 8 is a high intensity mixer such as a Littleford type.

The minerals employed in the present process are those capable of structural reorganization. Such minerals, upon heating to a transition temperature, undergo a structural transformation to reorientate their crystal lattice. In many minerals, such transformation is irreversible, but in other minerals the transformation is reversible. Accordingly, the present process is applicable to minerals such as fluorspar (fluorite), spodumene, pyrolusite, braunite, quartz, apatite, bobierrite, evansite, zirconium silicate, feldspars, leucite and anauxite. Fluorspar, or fluorite is a transparent or translucent mineral having the formula $CaF_2$ that consists of calcium fluoride. Spodumene is a lithia aluminosilicate having the theoretical formula $Li_2O.Al_2O_3.4SiO_2$. Pyrolusite is a manganese dioxide having the formula $MnO_2$ that is of an iron-black or dark steel-gray color. Braunite is also a manganese mineral having the formula $Mn_2O_3$ that is brownish black or steel-gray in color. Quartz is a silicon dioxide having the formula $SiO_2$ that is typically colorless and transparent. Apatite may be any of a group of calcium phosphate minerals containing other elements or radicals (as fluorine, chlorine, hydroxyl, or carbonate) having the general formula $Ca_5(F, Cl, OH, \frac{1}{2}CO_3)(PO_4)_3$ and occurring as the chief constituent of phosphate rock. Bobierrite is a hydrous magnesium phosphate mineral having the formula $Mg_3(PO_4)_2.8H_2O$. Evansite is an aluminum phosphate mineral having the formula $Al_3(PO_4)(OH)_6.6H_2O$. Zirconium silicate occurs in nature as zircon and has the formula $ZrSiO_4$. Feldspar is any of a group of aluminum silicates generally white or nearly white in color and having the general formula $Me(AlSi_3O_8)$ where Me may be lithium, sodium, potassium, calcium or barium. Leucite is a potassium aluminum silicate having the formula $KAlSi_2O_6$ that is typically white or gray in color. Anauxite is a hydrous aluminum silicate having the formula $Al_2Si_3O_7(OH)_4$. As previously mentioned, all of the above minerals undergo a transformation whereby the mineral undergoes a structural reorganization upon heating to reorientate its crystal lattice. Typically, the mixture contains from about 86% to about 96% by weight of the mineral concentrate. All of the above described minerals are well known and are readily available in the industry from numerous sources.

The water employed can be from any source. Oily small amounts of water are utilized in the mixture. Typically, from about 2% to about 8% by weight is employed. Preferably, from about 2% to about 4% is utilized so that the mixture may be readily mixed and thereafter transported to pelletizer 10, yet not contain excessive amounts of water. This enables the mixture to be dried in dryer 12 at a relatively low temperature, i.e. from about 200° C. to about 400° C. to conserve energy and its related costs.

The halogen anion source can be any chloride, fluoride, bromide or iodide salt or ester. These anions are typically obtained in the form of salts such as calcium, sodium, potassium, ammonium, magnesium, aluminum, iron and copper salts. The preferred halogen anion is a metal chloride salt, with the most preferred being calcium chloride. The above halogen anions are readily available in the industry from numerous sources. Typically from about 2% to about 6% by weight of halogen anion source is employed with the preferred amount being about 2–4% by weight.

After the mineral concentrate 2, water 4 and halogen anion 6 is thoroughly mixed together, the mixture is fed to a pelletizer 10 where the mixture is agglomerated into small pellets or other discrete shapes for further processing. These discrete shapes may be referred to as pellets, cubes, blocks, wafers, briquettes, crumbles, nuts, and so on. The only requirement being such discrete shapes must be readily processed, transported and acceptable to dryer 12. Accordingly, dryer 12 may be any conventional oven or other equipment which may be utilized to remove water 4 from the "pelletized mixture". Typically, a continuous band type dryer operated at a temperature of about 200° C. to about 400° C. may be employed.

Figure 2:
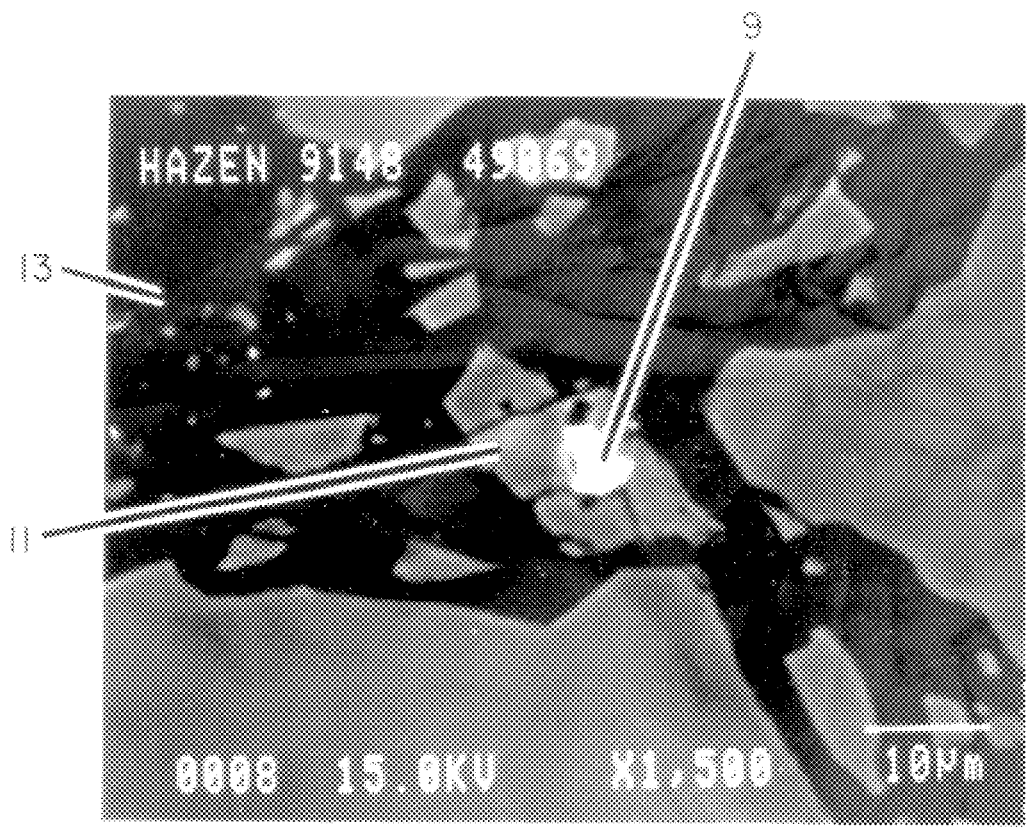
FIG. 2 is a photomicrograph at x1500 magnification of a polished cross section of a fluorspar particle prior to its structural reorganization.

FIG. 2 illustrates a polished cross section of a fluorspar particle at this stage of the process and prior to its structural reorganization. As depicted, an arsenic particle 9 is encapsulated within a fluorspar particle 11 which in turn is bound by an epoxy matrix 13. As is conventional, epoxy is employed to bind the fluorspar particles 11 together to enable the sectioning and the taking of a photomicrograph. Of particular importance is the sharp angularity of the fluorspar particles 11.

After water from the pelletized mixture is removed in dryer 12, the "pellets" are then fed to a rotary kiln 14 where the temperature of the mixture, i.e. the now dried pellets, is raised to between about 450° C. and about 1200° C. Depending upon the mineral being purified, kiln 14 is employed to heat the mixture containing the mineral to the mineral's structural reorganization transition temperature and to hold the mineral mixture at this temperature so that the mineral undergoes at least partial, but preferably complete structural reorganization. With respect to fluorspar, this mineral structurally reorganizes at approximately 1150° C. to 1190° C., and thus kiln 14 would typically heat the mixture from about 1170° C. to about 1180° C. With respect to spodumene, this mineral undergoes an irreversible structural transformation (from its alpha form to its beta form) upon heating to a temperature of about 500° C. With respect to the mineral pyrolusite, this mineral has a transition temperature of between about 650° C. to about 700° C. With respect to braunite, this mineral has a transition temperature of between about 1150° C. to about 1200° C. Quartz has a transition temperature of between about 530° C. to about 615° C. Apatite has a transition temperature of between about 825° C. to about 875° C. Bobierrite has a transition temperature of between about 675° C. to about 710° C. Evansite has a transition temperature of between about 675° C. to about 710° C. Zirconium silicate has a transition temperature of between about 640° C. to about 720° C. Feldspars have transition temperatures of between about 700° C. to about 900° C. Leucite has a transition temperature of about 620° C. Finally, anauxite has a transition temperature of between about 975° C. to about 1010° C.

The mixture is then retained within kiln 14 and is held therein at the structural transition temperature for a sufficient amount of time for the mineral to at least partially and preferably completely reorganize its crystal structure. This change in the mineral's structure allows any impurity contained in its crystal lattice to become free and available, thus allowing the impurity to be mobile which enables the impurity to freely migrate from the lattice and combine with the halogen anion. Preferably, the "pelletized" mixture is held at the transition temperature for a sufficient amount of time to cause a complete structural reorganization, and depending upon the particular mineral employed this period of time may typically be from about 10 minutes to about 120 minutes, preferably 45 to 75 minutes.

Figure 3:
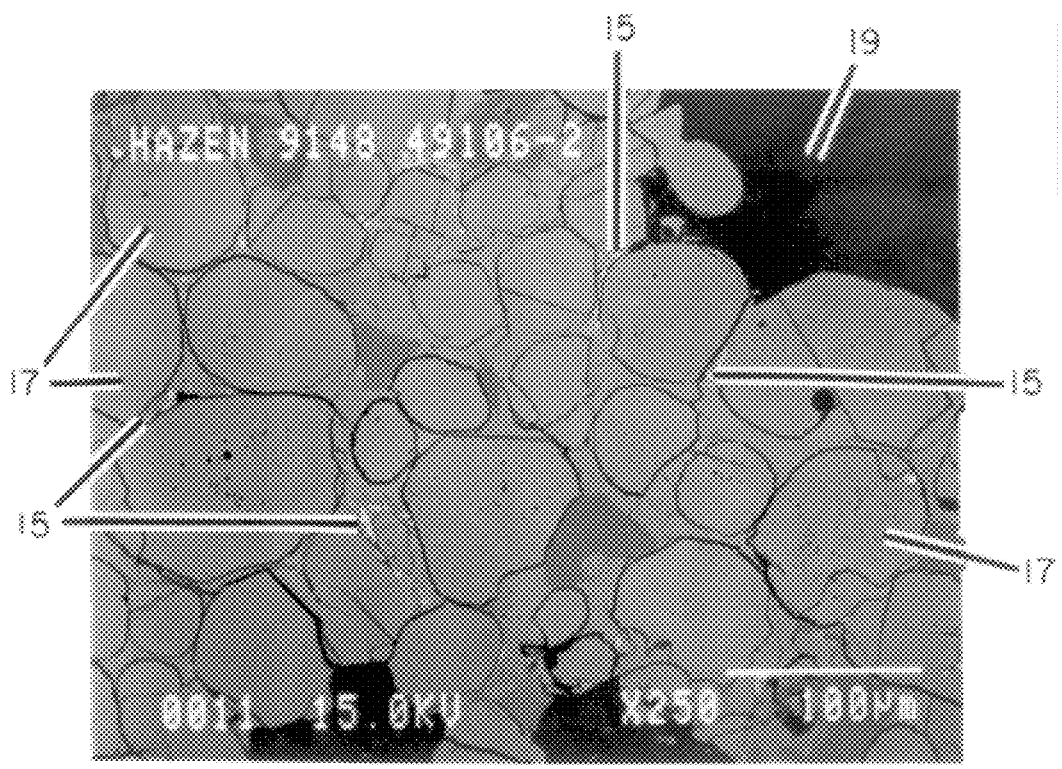
FIG. 3 is a photomicrograph at x250 magnification of a polished cross section of a fluorspar particle after its structural reorganization.

FIG. 3 illustrates a polished cross section of a fluorspar particle at this stage of the process and subsequent to undergoing structural reorganization. As depicted, arsenic particles 15 are dispersed throughout the lattice of fluorspar particles 17 which, as previously noted, are bound together by an epoxy matrix 19. Of particular importance is the rounded shape of the fluorspar particles 17.

The final step in the process is to remove the combined impurity and anion from the mixture by separating the combined impurity and anion from the mineral. For this purpose, a leaching circuit 16 is employed to thus render the mineral essentially free of the impurity. The leaching circuit 16 utilizes an acid such as hydrochloric acid or nitric acid, or a base such as sodium hydroxide, depending on the impurity and anion, to solubilize the combined impurity and anion. Although leaching is the preferred method for separating the impurity, other methods such as flotation may also be employed.

Figure 4:
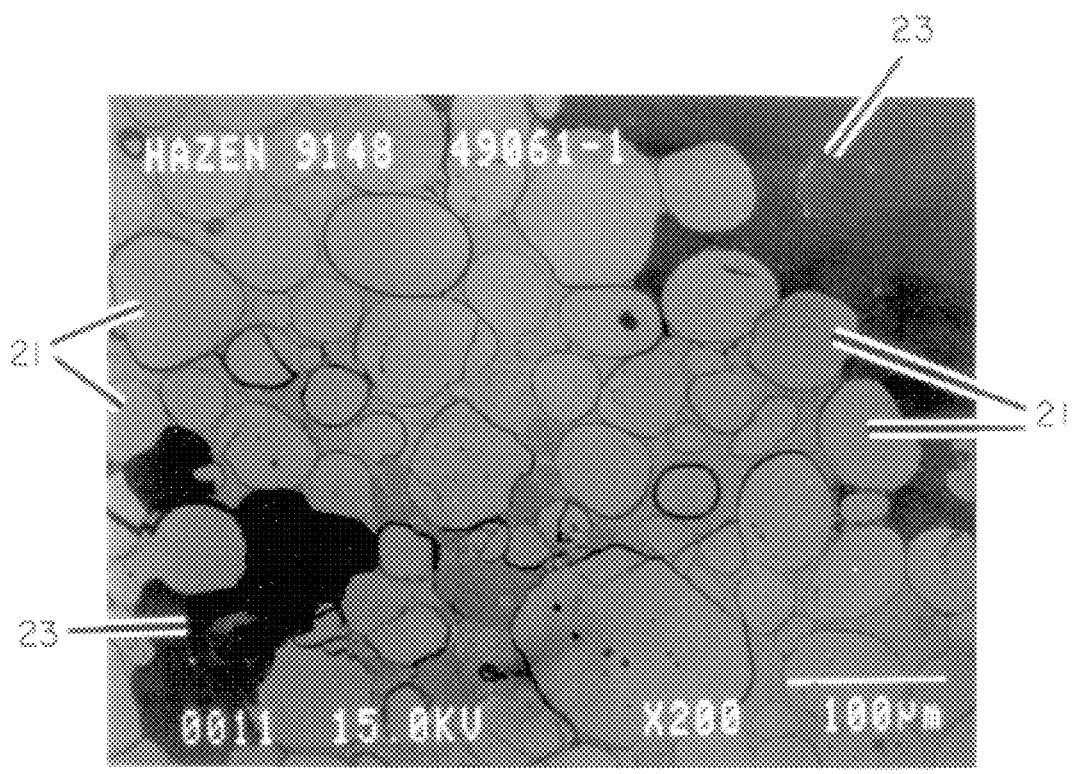
FIG. 4 is a photomicrograph at x20 magnification similar to FIG. 3 of a fluorspar particle having additionally been subjected to an acid leaching process.

FIG. 4 illustrates a polished cross section of a fluorspar particle at this stage of the process and after leaching. As depicted, there are no detectable arsenic particles dispersed or encapsulated in either the fluorspar particles 21 or the epoxy matrix 23.

The above-described process may be utilized to remove numerous undesirable impurities found in the crystal lattice of minerals. Such impurities include arsenic, antimony and tin, and metals such as nickel and manganese, as well as other cations such as magnesium and potassium. The process performs especially well to remove arsenic from fluorspar when utilizing calcium chloride as the halogen anion and hydrochloric acid in the leaching circuit 16.

In some cases, and depending upon the particular mineral, a matrix-forming additive represented by 18 may be added to the mixture in mixer 8. The additive 18 is employed to provide a receptor for the impurity to concentrate and combine with the impurity to form a matrix which thereafter immobilizes the impurity so that it can be more easily removed. One especially effective additive has been found to be a silicate, which may be added in the form of bentonite in mixer 8. Other matrix-forming additives include various clays such as those of the kaolinite group.

The following examples will serve to demonstrate the advantages and efficacy of the invention. These examples are merely intended for illustration without in any way limiting the scope of the invention.

EXAMPLE 1

This example illustrates, in general, the process of the present invention. First, a mixture of 93% fluorspar, 4% calcium chloride and 2.5% bentonite as solids was formed. The solids so formed were mixed with 10% water. This mixture was then agglomerated into small pellets, and dried at a temperature of about 400° C. to remove the water. The pellets were then fed to a rotary kiln where the temperature was raised to 1175° C. and held at that temperature for approximately 70 minutes. During this time, the fluorspar structurally reorganized and arsenic contained in the crystal lattice of the fluorspar combined with the chloride from the calcium chloride and migrated to the silicate which made the arsenic immobile. Although some of the arsenic was lost in the gas stream from the rotary kiln as $AsCl_3$, majority of the arsenic remained with the silicate matrix as shown by the data in table 1 below. The arsenic attached to the silicate matrix was then removed by leaching with hydrocloric acid to render the fluorspar essentially free of arsenic.

EXAMPLE 2

In these experiments, various different combinations of bentonite and calcium chloride were admixed with fluorspar and processed in accordance with Example 1 at various kiln temperatures. The data in Table 1 below illustrates the amount of arsenic freed from the crystal lattice, and further illustrates that the fluorspar, after processing by the present method, was essentially free of arsenic. In addition, it should be noted that when a non-silicate such as lignosulfonate is substituted for bentonite (see test #SSBK-2 and #SSBK-1), the process becomes very inefficient.

TABLE 1

SUMMARY OF KILN TESTS

| Test # | Sample Time (Min.) | Agglomerates Size (Inch) Pellet | Extruder | Product (PPM As) Kiln (As) | Lix (As) | Prod. Weight (Lbs) | % Loading | Drying Temp. ° C. | Underbed Temp (Avg.) ° C. |
|---|---|---|---|---|---|---|---|---|---|
| SSBK-15 | EOP | 6 × 9 MM | | | 57 | 13.995 | 10% | N/A | 1151 |
| | 15 | 2.5% Bent + 6% CaCl2 | | | 26 | | 17.11 lbs | | |
| | 30 | | | | 22 | | Wet feed | | |
| | 45 | | | | 14 | | To kiln | | |
| | 60 | | | | 12 | | | | |
| | 75 | | | | 12 | | | | |
| Prod. WC 15 min. | | | | | 8 | | | | |
| Prod. AC 75 min. | | | | | 8 | | | | |
| SSBK-14 | EOP | 6 × 9 MM | | | 57 | 14.173 | 10 | 177 | 1151 |
| | 15 | 2.5% Bent + 6% CaCl2 | | | 19 | | 15.44 lbs | | |
| | 30 | | | | 16 | | Feed to kiln | | |
| | 45 | | | | 14 | | (7 KG) | | |
| | 60 | | | | 12 | | | | |
| | 75 | | | | 8 | | | | |
| Prod. WC 75 Min. | | | | | 8 | | | | |
| Prod. AC 75 Min. | | | | | 8 | | | | |
| SSBK-13 | EOP | ⅛ × ¼ | | | 46 | 14.35 | 10 | 177 | 1151 |
| | 15 | | 2.5% Bent + 6% CaCl2 | | 19 | | | | |
| | 30 | | | | 18 | | | | |
| | 45 | | | | 17 | | | | |
| | 60 | | | | 15 | | | | |
| | 75 | | | | 12 | | | | |

TABLE 1-continued

SUMMARY OF KILN TESTS

| Test # | Sample Time (Min.) | Agglomerates Size (Inch) Pellet | Extruder | Product (PPM As) Kiln (As) | Lix (As) | Prod. Weight (Lbs) | % Loading | Drying Temp. ° C. | Underbed Temp (Avg.) ° C. |
|---|---|---|---|---|---|---|---|---|---|
| Prod. WC 75 Min. | | | | | 12/22 | | | | |
| Prod. AC 75 Min. | | | | | 12 | | | | |
| SSBK-12 | EOP | ⅛ × ¼ | | | 40 | 12.54 | 10 | 177 | 1042 |
| | 15 | 1.2% Bent + 12% CaCl2 | | | 25 | | | | |
| | 30 | | | | 18 | | | | |
| | 45 | | | | 12 | | | | |
| | 60 | | | | 12 | | | | |
| | 75 | | | | 12 | | | | |
| Prod. WC 75 Min. | | | | | 12 | | | | |
| Prod. AC 75 Min. | | | | | 7 | | | | |
| SSBK-11 | EOP | ⅛ × ¼ | | | 40 | 15.05 | 10 | 177 | 1157 |
| | 15 | 2.5% Bent + 6% CaCl2 | | | 10 | | | | |
| | 30 | | | | 4/4 | | | | |
| | 45 | | | | 4 | | | | |
| | 60 | | | | 4 | | | | |
| | 75 | | | | 4 | | | | |
| Prod. WC 75 Min. | | | | | 4/4 | | | | |
| Prod. AC 75 Min. | | | | | 4 | | | | |
| SSBK-10 | EOP | ⅛ × ¼ | | | 39 | 13.58 | 10 | 177 | 1156 |
| | 15 | 1.2% Bent + 6%CaCl2 | | | 11 | | | | |
| | 30 | | | | 9 | | | | |
| | 45 | | | | 9 | | | | |
| | 60 | | | | 9 | | | | |
| | 75 | | | | 9 | | | | |
| Prod. WC 75 Min. | | | | | 4 | | | | |
| SSBK-09 | 30 | 6 × 9 mm | | | 8.4/30 | 13.66 | 10 | 177 | 1161 |
| | 45 | 1.2% Bent + 6% CaCl2 | | | 12 | | | | |
| | 75 | | | | 10/12/7.8 | | | | |
| Prod. WC 75 Min. | | | | | 12 | | | | |
| Prod. AC 75 Min. | | | | 235 | 15 | | | | |
| SSBK-08 | 30 | 6 × 9 mm | | | 27 | 14.41 | 10 | 177 | 1164 |
| | 45 | 1.2% Bent + 4% CaCl2 | | | 20 | | | | |
| | 75 | | | | 16 | | | | |
| Prod. WC 75 Min. | | | | | 16 | | | | |
| Prod. AC 75 Min. | | | | 232 | 19 | | | | |
| SSBK-07 | 30 | 6 × 9 mm | | | 35 | 14.25 | 10 | 177 | 1166 |
| | 45 | 1.2% Bent + 2% CaCl2 | | | 20 | | | | |
| Prod. WC 75 Min. | | | | | 19 | | | | |
| Prod. AC 75 Min. | | | | 237 | 18 | | | | |
| SSBK-06 | 15 | 6 × 9 mm | | | 50 | 13.15 | 10 | 177 | 1170 |
| | 30 | 1.2% Bent + 2% CaCl2 | | | 34 | | | | |
| | 45 | | | | 26 | | | | |
| Prod. WC 75 Min. | | | | | 22/21/10 | | | | |
| Prod. AC 75 Min. | | | | | 0.65/8 | | | | |
| SSBK-05 | EOP | 6 × 9 mm | | | 154 | 13.67 | 10 | 177 | 1170 |
| | 30 | 0.5% Bent + 2% CaCl2 | | | 36 | | | | |
| | 60 | | | | 35 | | | | |
| Prod. WC 75 Min. | | | | | 21/11 | | | | |
| Prod. AC 75 Min. | | | | | 18/14 | | | | |
| SSBK-04 | EOP | 6 × 9 mm | | | 115 | 14.5 | 10 | 177 | 1167 |
| | 30 | 0.5% Bent + 2% CaCl2 | | | 40/21 | | | | |
| | 60 | | | | 26 | | | | |
| Prod. WC 75 Min. | | | | | 24/10/16 | | | | |
| Prod. AC 75 Min. | | | | | 24/13/10 | | | | |
| SSBK-3 | EOP | 6 × 9 mm | | | 120 | | 10 | 177 | |
| | 30 | 1.2% Bent + 2% CaCl2 | | | 33 | | | | |
| Prod. WC 75 Min. | | | | | 0 | | | | |
| Prod. AC 75 Min. | | | | | 29 | | | | |
| SSBK-2 | EOP | 6 × 9 mm | | | 321 | 11 | 10 | 177 | 1000 |
| | 15 | 2% LS + 2% CaCl2 | | | 200 | | | | 1000 |
| | 45 | | | | 280 | | | | 1000 |
| | 15 | | | | 325 | | | | 1100 |
| | Prod. | | | | 31 | | | | 1100 |
| SSBK-1 | 45 | | ¼ | 220 | 10 | | | 177 | 1120 |
| | 90 | 2% Lignin + 1% CaCl2 | | 222 | 10 | | | | 1101 |
| | Prod. | | | 213 | 10 | | | | 1103 |

What is claimed is:

1. A process for removing impurities contained in the crystal lattice of minerals, comprising the steps of:
forming a mixture of a mineral capable of structurally reorganizing its crystal lattice and which contains an impurity in its crystal lattice, a halogen anion, water and a matrix-forming additive to facilitate the migration of the impurity from said crystal lattice, said matrix-forming additive is selected from the group consisting of a silicate, and a kaolinite clay;
heating the mixture to the structural reorganization transition temperature of the mineral;
holding the mixture at the structural reorganization transition temperature for a sufficient amount of time to freely migrate the impurity from the crystal lattice and combine with the halogen anion and matrix-forming additive; and
separating the combined impurity, matrix-forming additive and anion from said mixture to render the mineral essentially free of said impurity.

2. The method of claim 1 wherein said mineral is selected from the group consisting of fluorspar, spodumene, pyrolusite, braunite, quartz, apatite, bobierrite, evansite, zirconium silicate, feldspars, leucite and anauxite.

3. The method of claim 1 wherein said halogen anion is selected from the group consisting of chlorides, fluorides, bromides and iodides.

4. The method of claim 1 wherein said halogen anion is a metal chloride.

5. The method of claim 4 wherein said metal chloride comprises calcium chloride.

6. The method of claim 1 wherein the structural reorganization transition temperature is between about 450° C. and about 1200° C.

7. The method of claim 1 wherein impurity is selected from the group consisting of arsenic, antimony, tin, nickel, manganese, magnesium cations and potassium cations.

8. The method of claim 1 wherein the step of separating comprises solubilizing the combined impurity and anion.

9. The method of claim 8 wherein the step of solubilizing comprises leaching with an acid.

10. The method of claim 9 wherein said acid is hydrochloric acid.

11. The method of claim 8 wherein the step of solubilizing comprises leaching with a base.

12. The method of claim 11 wherein said base is sodium hydroxide.

13. The method of claim 1 further including the steps agglomerating the mixture into a discreet shape, and drying the agglomerated mixture to remove substantially all water prior to heating the mixture to said structural reorganization transition temperature.

14. The method of claim 1 wherein said silicate is added in the form of bentonite.

15. The method of claim 1 wherein said mixture comprises from about 86% to about 96% by weight of said mineral, from about 2% to about 6% by weight of a source of said halogen anion, from about 2% to about 8% by weight of said water, and from about 0.5% to about 2.5% by weight of said matrix-forming additive.

16. The method of claim 1 wherein said mixture comprises from about 86% to about 96% by weight of said mineral, from about 2% to about 4% by weight of a source of said halogen anion, from about 2% to about 4% by weight of said water, and from about 1.2% to about 2.5% by weight of said matrix-forming additive.

17. The method of claim 1 wherein said halogen anion comprises a chloride anion.

18. The method of claim 1 wherein said mixture includes about 2.5% by weight of bentonite as the matrix-forming additive and about 6% by weight calcium chloride as a source of said halogen anion.

* * * * *